E. R. STILWELL.
Cases for Turbine Water-Wheels.
No. 158,997.  Patented Jan. 19, 1875.
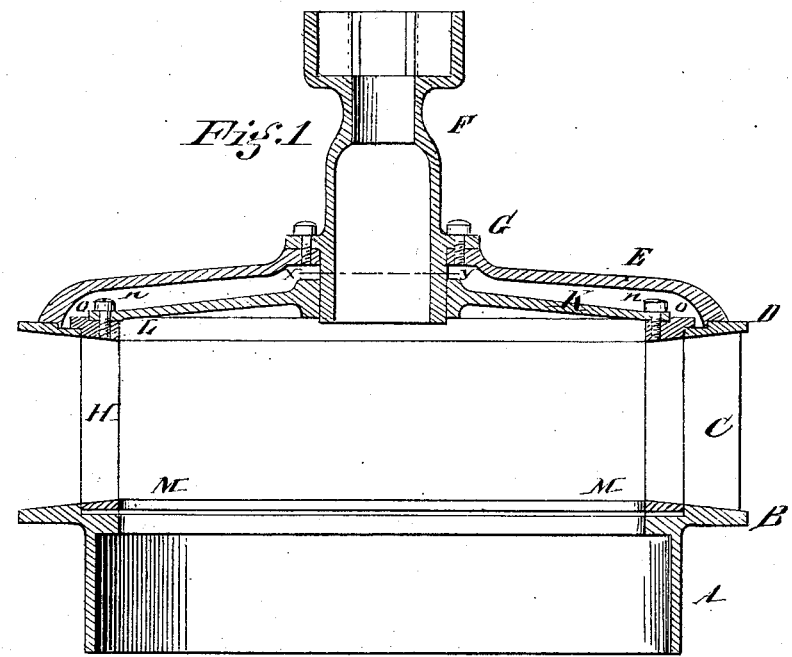
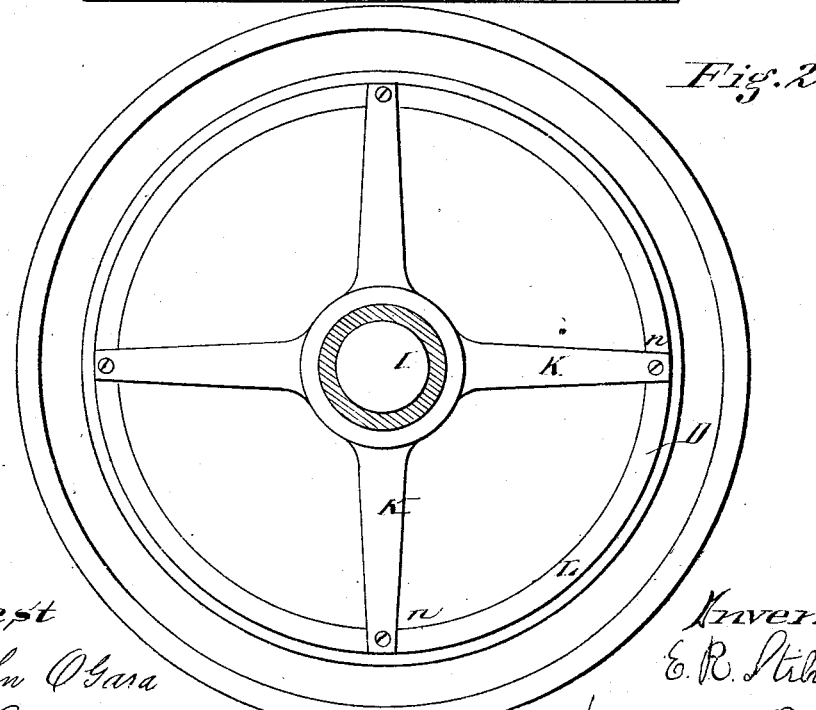
Attest
John O'Gara
Herman Merrell
Inventor
E. R. Stilwell
By Wood & Boyd
His Attys

UNITED STATES PATENT OFFICE.

EDWIN R. STILWELL, OF DAYTON, OHIO, ASSIGNOR TO THE STILWELL & BIERCE MANUFACTURING COMPANY, OF SAME PLACE.

IMPROVEMENT IN CASES FOR TURBINE WATER-WHEELS.

Specification forming part of Letters Patent No. 158,997, dated January 19, 1875; application filed December 19, 1874.

*To all whom it may concern:*

Be it known that I, EDWIN R. STILWELL, of Dayton, in the county of Montgomery and State of Ohio, have invented certain new and useful Improvements in Case for Turbine Water-Wheels, of which the following is a specification:

My invention relates to an improvement in duplex or register cases for turbine water-wheels, and applies to that class in which the inner part of the case is made to revolve to open, close, or regulate the width of chutes which direct the water onto the wheel; and consists in providing a central axial bearing, composed of a hub journaling on a sleeve attached to the crown-plate, the hub being connected to the inner or revolving part of the case by arms or other suitable means.

Figure 1 represents a central vertical section of my improved wheel-case. Fig. 2 is a top plan of the same with the crown-plate removed.

A represents the cylinder or bottom of the case, within which the bridge-tree is attached. B C D represent the flanges and chutes of the outer or stationary part of the case. H L M represent the chutes and flanges of the inner or revolving part of the chute-case. The annular rim L has a lip or flange, O, projecting radially outward, and forming an annular bearing for sustaining the weight of the inner or register part of the chute-case upon the rim D of the stationary part of the case. I represents a hub, which is rigidly connected to the register-case L by means of arms K, which are represented as being secured to the rim L by nuts *n*. Other well-known means of connecting the hub I to the rim L may be employed. F represents a sleeve projecting downwardly from the center of the crown-plate E. Through this sleeve the shaft of the wheel passes. This sleeve extends below the crown-plate E a sufficient distance to form a cylindrical bearing, upon which hub I journals. The parts should be accurately fitted, so as to form a true axial or journal bearing. This central bearing serves to keep the faces of the inner chutes perfectly parallel with those of the outer chutes, C, and allows the parts to be brought close together, forming a close joint, but without bringing the faces of the chutes C and H into actual contact as the inner case is revolved; also, the journal being in the center of the moving part of the case, less friction is required to maintain the plane of its movement than would be required by the employment of the outer bearing, O. By placing the bearing of the inner case at the top, immediately under the crown-plate E, the weight of the column of water acting on the wheel is prevented from pressing on the surfaces of the hub I and arms K, and friction from the moving of these parts under weight of water is avoided. Again, this location of the bearings prevents sand and grit from being forced into the joints, as the water containing these substances is not brought into contact with these parts. The central journal-bearing also prevents the tendency to bring the faces of the chutes C and H into contact when power is applied to the outer periphery of H to revolve it. The flange O may be omitted, and a similar bearing may be made on the sleeve F to sustain the weight of the revolving chute; but this plan would not distribute the weight and strain as fully as the means shown in the drawings.

This improvement, as shown, is adapted to be used with the register-case described in Letters Patent No. 130,055, granted the Stilwell & Bierce Manufacturing Company, July 30, 1872. It may, however, be applied to all register-cases the inner part of which revolves to admit or exclude the water. Other means than the lip or flange O may be employed to suspend the revolving chute; but this I deem to be the best bearing for that purpose.

What I claim as my improvement is—

1. A case for water-wheels, with the inner register or chute provided with a central hub and journal-bearing, located under the crown-plate, substantially as set forth.

2. A case for a water-wheel, with an inner revolving chute or register, provided with an outer annular bearing, O, and a central hub and journal-bearing, I, substantially as herein set forth.

In testimony whereof I have hereunto set my hand this 10th day of December, 1874.

EDWIN R. STILWELL.

Witnesses:
O. M. GOTTSCHALL,
CHAS. H. FINCH.